(12) United States Patent
Takahashi et al.

(10) Patent No.: US 9,493,599 B2
(45) Date of Patent: Nov. 15, 2016

(54) MODIFIED POLYMER

(71) Applicant: The Yokohama Rubber Co., LTD., Minato-ku, Tokyo (JP)

(72) Inventors: Ryota Takahashi, Hiratsuka (JP); Takahiro Okamatsu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/443,371

(22) PCT Filed: Nov. 15, 2013

(86) PCT No.: PCT/JP2013/080923
§ 371 (c)(1),
(2) Date: May 15, 2015

(87) PCT Pub. No.: WO2014/077364
PCT Pub. Date: May 22, 2014

(65) Prior Publication Data
US 2015/0322190 A1    Nov. 12, 2015

(30) Foreign Application Priority Data

Nov. 16, 2012 (JP) .................. 2012-252216

(51) Int. Cl.
| | | |
|---|---|---|
| *C08F 8/30* | (2006.01) |
| *C08C 19/22* | (2006.01) |
| *C08F 236/10* | (2006.01) |
| *B60C 1/00* | (2006.01) |
| *C08K 5/32* | (2006.01) |

(52) U.S. Cl.
CPC ............... *C08F 236/10* (2013.01); *B60C 1/00* (2013.01); *C08C 19/22* (2013.01); *C08F 8/30* (2013.01); *C08K 5/32* (2013.01)

(58) Field of Classification Search
CPC ........ C08F 8/30; C08F 236/10; C08C 19/22; C08K 5/32
USPC .................................. 525/331.9, 332.9, 377
See application file for complete search history.

(56) References Cited

U.S. PATENT DOCUMENTS 3,792,031 A * 2/1974 Udding ................... C08C 19/22
525/333.1
2007/0004869 A1* 1/2007 Parker ................... B60C 1/0016
525/331.9

FOREIGN PATENT DOCUMENTS

| JP | S47-25712 | 7/1972 |
| JP | S48-16996 | 3/1973 |
| JP | 2007-70439 | 3/2007 |

OTHER PUBLICATIONS

International Search Report for International Application No. PCT/JP2013/080923 dated Jan. 14, 2014, 4 pages, Japan.

* cited by examiner

*Primary Examiner* — Roberto Rabago
(74) *Attorney, Agent, or Firm* — Thorpe North & Western

(57) ABSTRACT

The present technology provides a modified polymer which is modified with two or more types of nitrones that include a nitrone having at least one carboxy group and a nitrone having no carboxy group.

15 Claims, No Drawings

MODIFIED POLYMER

TECHNICAL FIELD

The present technology relates to modified polymers.

BACKGROUND

Modified polymers that are modified by various nitrones have been known conventionally as polymers contained in rubber compositions for use in tires and the like (see, e.g., Japanese Examined Patent Application Publication No. S47-25712A, and Japanese Unexamined Patent Application Publication Nos. S48-16996A and 2007-70439A).

The present inventors have found that, even though cases where a modified polymer that is modified with a nitrone having a carboxy group enhances the value of tan δ (60° C.), and even though cases where a modified polymer that is modified with a nitrone having no carboxy group (e.g. diphenylnitrone) enhances the value of tan δ (0° C.), compared to a case where an unmodified polymer is used, tensile properties such as tensile strength ($T_B$) and/or elongation at break ($E_B$) are significantly lowered in both the cases.

Note that tan δ (0° C.) and tan δ (60° C.), which are loss tangents (loss factors), are known as an indicator of wet grip performance and an indicator of rolling resistance, respectively.

SUMMARY

The present technology provides a modified polymer which enhances the tensile properties and loss tangent of a vulcanized product when the modified polymer is used in the vulcanized product.

The present inventors have found that a vulcanized product formed with a modified polymer that is modified with two or more types of specific nitrones can achieve excellent values of tan δ (0° C.) and tan δ (60° C.) while suppressing the lowering of tensile properties, and thus completed the present technology.

Specifically, the present technology provides the following (1) to (7).

(1) A modified polymer that is modified with two or more types of nitrones including (A) a nitrone having at least one carboxy group and (B) a nitrone having no carboxy group.

(2) The modified polymer according to (1) above, wherein the nitrone (B) is a nitrone having at least one aromatic hydrocarbon group.

(3) The modified polymer according to (1) or (2) above, wherein the nitrone (A) is a nitrone represented by formula (a) described below.

(4) The modified polymer according to any one of (1) to (3) above, wherein the nitrone (B) is a nitrone represented by formula (b) described below.

(5) The modified polymer according to any one of (1) to (4) above, wherein the modified polymer contains a five-membered ring structure represented by formula (I) described below.

(6) The modified polymer according to any one of (1) to (5) above, wherein the modified polymer contains a five-membered ring structure represented by formula (II) described below.

(7) The modified polymer according to any one of (1) to (6) above, wherein a molar ratio (A/B) of the nitrone (A) to the nitrone (B) is from 1/1 to 1/100.

The present technology can provide a modified polymer which enhances the tensile properties and loss tangent of a vulcanized product when the modified polymer is used in the vulcanized product.

DETAILED DESCRIPTION

The modified polymer of the present technology is modified with two or more types of nitrones that include (A) a nitrone having at least one carboxy group and (B) a nitrone having no carboxy group. Note that "nitrone" is a generic term for compounds in which an oxygen atom is bonded to a nitrogen atom of a Schiff base.

For example, when a modified polymer that is modified with only nitrone having a carboxy group is used in a vulcanized product, the value of tan δ (60° C.) which is an indicator of rolling resistance becomes better (smaller) compared to a value of a case where an unmodified polymer is used.

On the other hand, when a modified polymer that is modified with only a nitrone having no carboxy group (e.g. diphenylnitrone) is used, the value of tan δ (0° C.) which is an indicator of wet grip performance becomes better (larger) compared to a value of a case where an unmodified polymer is used.

However, in the both cases, tensile properties such as tensile strength ($T_B$) and elongation at break ($E_B$) are significantly lowered compared to those of a case where an unmodified polymer is used. It is conceived that this is caused by increase in modulus due to interaction between a nitrone-modified moiety in the modified polymer and a filler contained in the vulcanized product.

However, when the modified polymer of the present technology is used, the values of tan δ (0° C.) and tan δ (60° C.) of a vulcanized product can be made excellent while lowering of the tensile properties of the vulcanized product is suppressed. It is conceived that this is because allowing the nitrone (A) having a carboxy group and a nitrone (B) having no carboxy group to coexist makes it possible for different effects of these nitrones to be exhibited individually. In other words, it is conceived that the effect of the nitrone (A), which strengthens an interaction between a polymer and a filler, and the effect of the nitrone (B), which strengthens an interaction between polymers, can be exhibited individually. It is conceived that this is because the interaction between the nitrone (B) and a filler becomes weaker since the nitrone (A) exhibits the stronger interaction with a filler than that of the nitrone (B), thereby the tangle of polymers strengthens due to the interaction caused in the nitrones (B) and lowering of the tensile properties can be suppressed.

Nitrone (A)

The nitrone (A) used in the present technology is not particularly limited as long as the nitrone (A) is a nitrone having at least one carboxy group (—COOH) (hereinafter, also referred to as "carboxynitrone" for convenience); however, for example, a carboxynitrone represented by formula (a) below is suitably used.

[Formula 1]

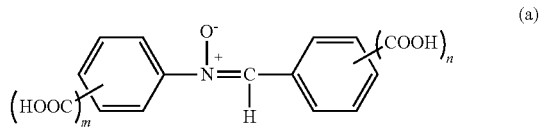

In formula (a), m and n each independently represent integers of 0 to 5, and a sum of m and n is 1 or greater.

The integer represented by m is preferably an integer of 0 to 2, and more preferably an integer of 0 or 1, because solubility to a solvent during nitrone synthesis will be better and thus synthesis will be easier.

The integer represented by n is preferably an integer of 0 to 2, and more preferably an integer of 0 or 1, because solubility to a solvent during nitrone synthesis will be better and thus synthesis will be easier.

Furthermore, the sum of m and n (m+n) is preferably from 1 to 4, and more preferably 1 or 2, because solubility to a polymer will be better and thus reactivity will be excellent.

Nitrone (B)

The nitrone (B) used in the present technology is not particularly limited as long as the nitrone (B) is a nitrone having no carboxy group, contrary to the nitrone (A) described above. Preferable examples include a nitrone having at least one aromatic hydrocarbon group.

Examples of the aromatic hydrocarbon group include aryl groups, aralkyl groups, and the like. Examples of the aryl group include a phenyl group, naphthyl group, anthryl group, phenanthryl group, biphenyl group, and the like. Among these, aryl groups having from 6 to 14 carbons are preferable, aryl groups having from 6 to 10 carbons are more preferable, and a phenyl group and a naphthyl group are even more preferable. Examples of the aralkyl group include a benzyl group, phenethyl group, phenylpropyl group, and the like. Among these, aralkyl groups having from 7 to 13 carbons are preferable, aralkyl groups having from 7 to 11 carbons are more preferable, and a benzyl group is even more preferable.

Furthermore, the aromatic hydrocarbon group may have a hetero atom, and examples of the aromatic hydrocarbon group include a pyridine group, imidazole group, furan group, thiophene group, and the like.

Examples of such a nitrone (B) having at least one aromatic hydrocarbon group include a nitrone represented by formula (b) below.

[Formula 2]

(b)

In formula (b), X and Y each independently represent aliphatic or aromatic hydrocarbon groups optionally having a substituent other than a carboxy group, and at least one of X or Y represents an aromatic hydrocarbon group optionally having a substituent other than a carboxy group.

Examples of the aliphatic hydrocarbon group represented by X and Y include alkyl groups, cycloalkyl groups, alkenyl groups, and the like. Examples of the alkyl group include a methyl group, ethyl group, n-propyl group, isopropyl group, n-butyl group, isobutyl group, sec-butyl group, tert-butyl group, n-pentyl group, isopentyl group, neopentyl group, tert-pentyl group, 1-methylbutyl group, 2-methylbutyl group, 1,2-dimethylpropyl group, n-hexyl group, n-heptyl group, n-octyl group, and the like. Among these, alkyl groups having from 1 to 18 carbons are preferable, and alkyl groups having from 1 to 6 carbons are more preferable. Examples of the cycloalkyl group include a cyclopropyl group, cyclobutyl group, cyclopentyl group, cyclohexyl group, and the like. Among these, cycloalkyl groups having from 3 to 10 carbons are preferable, and cycloalkyl groups having from 3 to 6 carbons are more preferable. Examples of the alkenyl group include a vinyl group, 1-propenyl group, allyl group, isopropenyl group, 1-butenyl group, 2-butenyl group, and the like. Among these, alkenyl groups having from 2 to 18 carbons are preferable, and alkenyl groups having from 2 to 6 carbons are more preferable.

Examples of the aromatic hydrocarbon group represented by X and Y include aryl groups, aralkyl groups, and the like. Examples of the aryl group include a phenyl group, naphthyl group, anthryl group, phenanthryl group, biphenyl group, and the like. Among these, aryl groups having from 6 to 14 carbons are preferable, aryl groups having from 6 to 10 carbons are more preferable, and a phenyl group and a naphthyl group are even more preferable. Examples of the aralkyl group include a benzyl group, phenethyl group, phenylpropyl group, and the like. Among these, aralkyl groups having from 7 to 13 carbons are preferable, aralkyl groups having from 7 to 11 carbons are more preferable, and a benzyl group is even more preferable.

Furthermore, the aromatic hydrocarbon group may have a hetero atom, and examples of the aromatic hydrocarbon group include a pyridine group, imidazole group, furan group, thiophene group, and the like.

The substituent other than a carboxy group that may be included in the hydrocarbon group represented by X and Y is not particularly limited. Examples of the substituent other than a carboxy group include lower alkyl groups having from 1 to 4 carbons, hydroxy groups, amino groups, nitro groups, carbonyl groups, carbonate groups, urethane groups, sulfonyl groups, alkoxy groups, ester groups, halogen atoms, and the like.

Note that examples of the aromatic hydrocarbon group having such a substituent include aryl groups having a substituent, such as a tolyl group and xylyl group; aralkyl groups having a substituent, such as a methylbenzyl group, ethylbenzyl group, and methylphenethyl group; and the like.

As described above, in the nitrone (B) represented by formula (b), at least one of X or Y in formula (b) is an aromatic hydrocarbon group optionally having a substituent other than a carboxy group; however, from the perspective of exhibiting superior tan δ (0° C.), both X and Y are preferably the aromatic hydrocarbon groups optionally having a substituent other than a carboxy group, and both X and Y are more preferably aromatic hydrocarbon groups.

Method of Synthesizing Nitrones

The method of synthesizing nitrones including the nitrone (A) and the nitrone (B) described above is not particularly limited, and a conventionally known method can be used. For example, nitrones having a nitrone group represented by formula —N⁺(—O⁻)=CH— are obtained by stirring a compound having a hydroxyamino group (—NHOH) and a compound having an aldehyde group (—CHO) at a molar ratio of 1.5:1 to 1:1.5 in the presence of an organic solvent (e.g. methanol, ethanol, tetrahydrofuran, and the like) at room temperature for 1 to 24 hours to allow the both groups to react.

Polymer (Unmodified)

An unmodified polymer used in the present technology is not particularly limited as long as the unmodified polymer is a polymer that can be modified with nitrones containing the nitrone (A) and the nitrone (B) described above. From the perspective of modification mechanism of the nitrone that will be described below, the unmodified polymer is preferably an unmodified polymer having an unsaturated bond.

Note that "unmodified" refers to a state that is not modified with a nitrone, and the word "unmodified" does not exclude polymers that have been modified with other components.

Examples of such an unmodified polymer include diene rubber components that are vulcanizable. Specific examples thereof include natural rubber, isoprene rubber, butadiene rubber, 1,2-polybutadiene, chloroprene rubber, butyl rubber, styrene butadiene rubber, nitrile rubber (acrylonitrile rubber and hydrogenated nitrile rubber), ethylene propylene diene rubber, and the like. One type of these unmodified polymers may be used alone, or two or more types of these may be used in combination.

Method of Producing Modified Polymer

The method of producing the modified polymer of the present technology is not particularly limited, and conventionally known methods can be used. Examples include a method of obtaining a modified polymer of the present technology by mixing an unmodified polymer described above and two or more types of nitrones including the nitrone (A) and the nitrone (B) described above at 100 to 200° C. for 1 to 30 minutes.

When the unmodified polymer described above has an unsaturated bond, a five-membered ring is obtained due to cycloaddition reaction that occurs between an unsaturated bond contained in the unmodified polymer and a nitrone group contained in the nitrones, as described in formula (1) below.

[Formula 3]

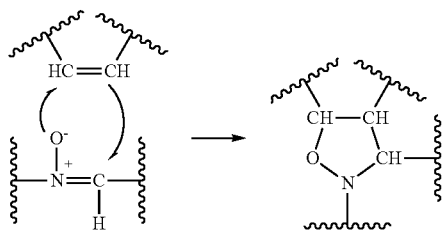

(1)

The molar ratio (A/B) of the nitrone (A) to the nitrone (B) in the nitrones that are reacted with the unmodified polymer is not particularly limited; however, the molar ratio is preferable from 1/1 to 1/100. From the perspective of exhibiting better effect of suppressing the lowering of the tensile properties, the molar ratio (A/B) is more preferably from 1/2 to 1/50, and even more preferably from 1/10 to 1/20.

The amount of the nitrone (A) that is reacted with the unmodified polymer is preferably from 0.01 to 1.0 mol %, and more preferably from 0.05 to 0.5 mol %, relative to the unmodified polymer from the perspective of exhibiting better effect of lowering tan $\delta$ (60° C.)

On the other hand, the amount of the nitrone (B) that is reacted with the unmodified polymer is preferably from 0.1 to 10.0 mol %, and more preferably from 0.5 to 2.0 mol %, relative to the unmodified polymer from the perspective of exhibiting better effect of increasing tan $\delta$ (0° C.)

Modified Polymer

The modified polymer of the present technology is a modified polymer that is obtained by modifying the unmodified polymer described above with two or more types of nitrones containing the nitrone (A) and the nitrone (B) described above.

Since a five-membered ring structure is formed in this modification as described based on formula (1) above, the modified polymer of the present technology preferably has a five-membered ring structure derived from the nitrone (A) represented by formula (I) below and/or a five-membered ring structure derived from the nitrone (B) represented by formula (II) below.

[Formula 4]

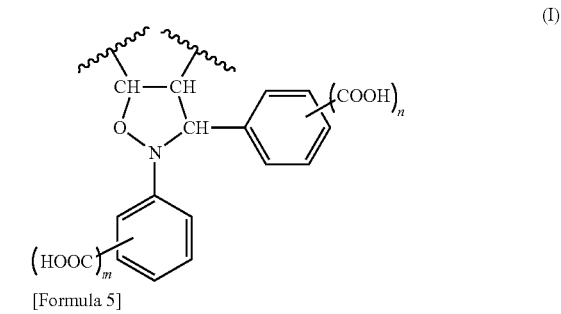

(I)

[Formula 5]

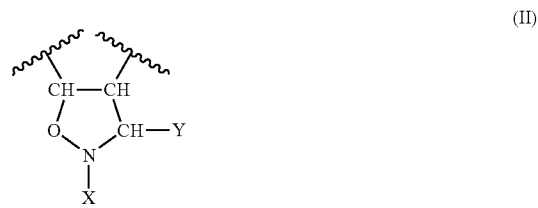

(II)

In formula (I), m and n are synonymous with m and n in formula (a) described above.

In formula (II), X and Y are synonymous with X and Y in formula (b) described above.

The modification rate of the nitrone (A) in the modified polymer of the present technology is preferably from 0.01 to 1.0 mol %, and more preferably from 0.05 to 0.5 mol %, from the perspective of exhibiting better effect of lowering tan $\delta$ (60° C.)

Furthermore, the modification rate of the nitrone (B) is preferably from 0.1 to 10.0 mol %, and more preferably from 0.5 to 2.0 mol %, from the perspective of exhibiting better effect of increasing tan $\delta$ (0° C.)

Note that, although the glass transition point (Tg) of the modified polymer of the present technology is not particularly limited, the glass transition point (Tg) is preferably from −120 to 50° C., and more preferably from −120 to 0° C.

The modified polymer of the present technology can be used as a composition (hereinafter, also referred to as "the composition of the present technology" for convenience) by adding various additives thereto.

Examples of the additives include various additives that are ordinarily used in rubber compositions such as silane coupling agents, fillers (e.g. silica, carbon black, and the like), zinc oxide, stearic acid, antiaging agents, processing aids, various oils, plasticizers (e.g. polyhydric alcohol, benzoic acid esters, phthalic acid esters, and the like), liquid polymers, terpene resins, thermosetting resins, vulcanizing agents, and vulcanization accelerators.

The compounded amount of the additives described above is not particularly limited and can be appropriately selected. For example, in the case of fillers such as silica, the compounded amount thereof is from 10 to 100 parts by mass per 100 parts by mass of the modified polymer of the present technology; however, the compounded amount is not limited to this.

The method of producing the composition of the present technology is not particularly limited, and examples thereof include a method whereby each of the above-mentioned components is kneaded using a publicly known method and device (e.g. Banbury mixer, kneader, roll, and the like).

Furthermore, the composition of the present technology is vulcanized under conventionally known vulcanization conditions to form a vulcanized product (hereinafter, also referred to as "vulcanized product of the present technology" for convenience).

The application of the composition of the present technology is not particularly limited; however, since the vulcanized product of the present technology that uses the modified polymer of the present technology exhibits excellent tensile properties and loss tangent, the composition of the present technology can be suitably used as compositions for use in tires, more specifically compositions for use in tire treads.

EXAMPLES

The present technology is described below in detail using working examples but is in no way restricted to these examples.

<Synthesis of Nitrone (A)>

In a 2 L egg-plant shaped flask, methanol heated to 40° C. (900 mL) was placed, and then terephthalaldehydic acid represented by formula (3) below (30.0 g) was added and dissolved. In this solution, a solution in which phenylhydroxylamine represented by formula (2) below (21.8 g) was dissolved in methanol (100 mL) was added and stirred at room temperature for 19 hours. After the completion of stirring, carboxynitrone (41.7 g) represented by formula (4) below was obtained by recrystallization from methanol. The yield was 86%.

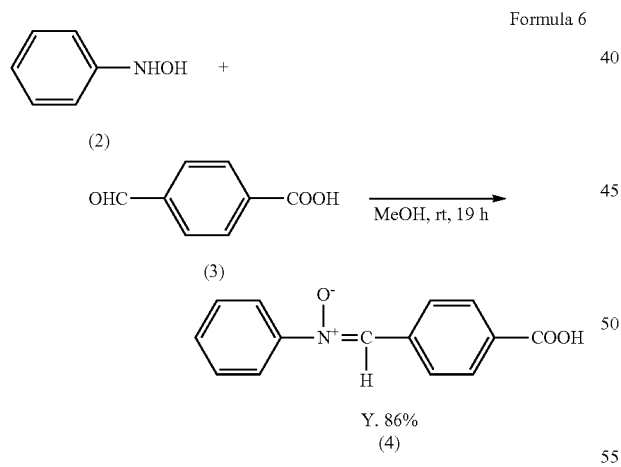

Formula 6

<Synthesis of Nitrone (B)>

Synthesis of Diphenylnitrone

In a 300 mL egg-plant shaped flask, benzaldehyde represented by formula (6) below (42.45 g) and ethanol (10 mL) were placed, and then a solution in which phenylhydroxylamine represented by formula (5) below (43.65 g) was dissolved in ethanol (70 mL) was added and stirred at room temperature for 22 hours. After the completion of stirring, diphenylnitrone (65.40 g) represented by formula (7) below was obtained as white crystal by recrystallization from ethanol.

The yield was 83%.

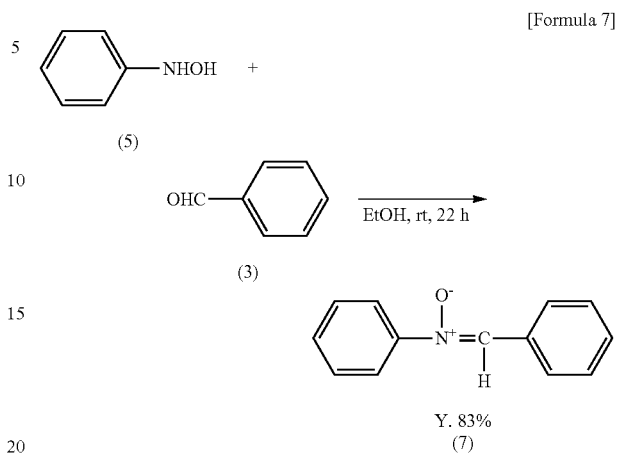

[Formula 7]

Synthesis of Monophenyl Nitrone

In a 300 mL egg-plant shaped flask, hexanal represented by formula (9) below (40.09 g) and ethanol (10 mL) were placed, and then a solution in which phenylhydroxylamine represented by formula (10) below (43.65 g) was dissolved in ethanol (70 mL) was added and stirred at room temperature for 20 hours. After the completion of stirring, ethanol and unreacted hexanal were removed by distillation, and then unreacted hydroxylamine was removed by extraction (ethyl acetate/1% hydrochloric acid) to obtain N-phenyl-α-pentylnitrone represented by formula (10) below (hereinafter, also referred to as "monophenyl nitrone" for convenience) as a yellow viscous liquid (61.01 g). The yield was 80%.

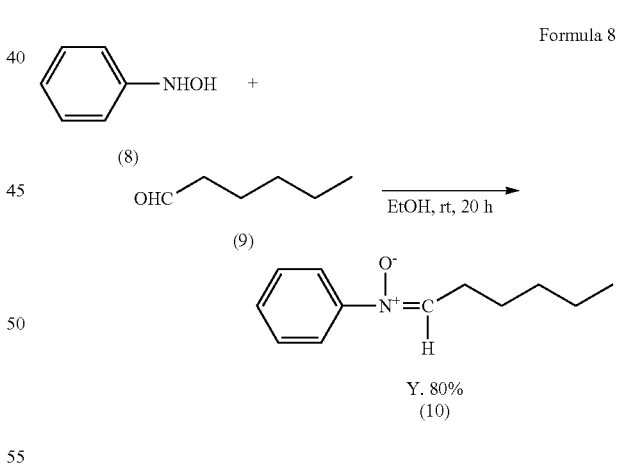

Formula 8

Comparative Examples 1 to 3 and Working Examples 1 to 6

The components shown in Table 1 below were blended at the proportions (parts by mass) shown in Table 1 below.

Specifically, in a Banbury mixer at 140° C., a polymer was placed and masticated for 2 minutes, and then silica (first, only 10 parts by mass) and the nitrone (A) and the nitrone (B) were added and mixed for 5 minutes to obtain a modified polymer. However, in Comparative Examples 1 to 3, either the nitrone (A) or the nitrone (B) or both the nitrone (A) and the nitrone (B) were not added. Especially in the Comparative Example 1, both the nitrone (A) and the nitrone (B) were not added and thus the polymer was not modified; however, the polymer may be referred to as "modified polymer" for convenience.

Next, to the obtained modified polymer, silica (the rest, 40 parts by mass) and components other than sulfur and a vulcanization accelerator were added and mixed for 5 minutes using a Banbury mixer at 120° C. Thereafter, a roll was used to mix the sulfur and the vulcanization accelerator thereto to obtain a composition. The obtained composition was then vulcanized to obtain a vulcanized product. The vulcanization was performed by press vulcanization (160° C.×20 minutes).

<Evaluation of Modified Polymer>

In each example, the following evaluations were performed for the obtained modified polymer and vulcanized product. The results are shown in Table 1 below.

Glass Transition Temperature: Tg

Using a differential scanning calorimetry (DSC; DSC823e, manufactured by Mettler Toledo), the glass transition temperature (unit: ° C.) was measured by heating the modified polymer from −130° C. to 40° C. at a rate of temperature increase of 10° C./min.

Modification Rate of all the Nitrones

The present inventors have found that a proportional relation exists between a modification rate of a modified polymer (unit: mol %) and a rate of change of Tg. Based on this knowledge, the modification rate of all the nitrones (nitrone (A) and nitrone (B)) in the modified polymer (unit: mol %) was determined using the following formula.

Modification rate=$\Delta Tg/3.6$ ($\Delta Tg$=Tg of modified polymer of each example−Tg of modified polymer of Comparative Example 1)

Modification Rate of Nitrone (A)

Modification rate (unit: mol %) of nitrone (A), which was carboxynitrone, was measured using $^1$H NMR. Specifically, after the sample was dissolved in toluene, the solution was added dropwise into a large excess amount of methanol which was being stirred, to perform precipitation. After performing the precipitation twice, the obtained precipitate was dried at 60° C. for 48 hours in a vacuum dryer and the obtained dried product was dissolved in deuterated chloroform to perform $^1$H NMR measurement. The modification rate was calculated from the value of ratio of proton amounts derived from the carboxynitrone.

Modification Rate of Nitrone (B)

The modification rate (unit: mol %) of the nitrone (B), which was diphenylnitrone, was determined from the difference between the modification rate of all the nitrones and the modification rate of the nitrone (A) determined as described above.

<Tensile Properties>

For each example, vulcanization was performed as described above to form a sheet with a thickness of 2 mm. A No. 3 dumbbell-shaped test piece was cut out of the sheet, and tensile test was conducted in accordance with JIS K6251 at a pulling speed of 500 mm/minute. The 100% modulus ($M_{100}$; unit: MPa), 300% modulus ($M_{300}$; unit: MPa), tensile strength ($T_B$; unit: MPa), and elongation at break ($E_B$; unit: %) were measured at room temperature.

<tan δ (0° C.)>

The loss tangent at a temperature of 0° C., tan δ (0° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency. Larger value of tan δ (0° C.) indicates superior wet grip performance.

<tan δ (60° C.)>

The loss tangent at a temperature of 60° C., tan δ (60° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency. Smaller value of tan δ (60° C.) indicates superior low heat build-up and rolling resistance.

TABLE 1

|  |  | Comparative Examples | | |
|---|---|---|---|---|
|  |  | 1 | 2 | 3 |
| Polymer |  | 100.00 | 100.00 | 100.00 |
| Nitrone (A) | Molecular weight |  | 1.00 (0.30 |  |
| (carboxynitrone) | 241.24 |  | mol %) |  |
| Nitrone (B) | Molecular weight |  |  | 10.00 (3.7 |
| (diphenylnitrone) | 197.23 |  |  | mol %) |
| Nitrone (B) | Molecular weight |  |  |  |
| (monophenyl nitrone) | 191.27 |  |  |  |
| Silica |  | 50.00 | 50.00 | 50.00 |
| Zinc oxide |  | 3.00 | 3.00 | 3.00 |
| Stearic acid |  | 1.00 | 1.00 | 1.00 |
| Antiaging agent |  | 1.00 | 1.00 | 1.00 |
| Silane coupling agent |  | 4.00 | 4.00 | 4.00 |
| Oil |  | 10.00 | 10.00 | 10.00 |
| Diethylene glycol |  | 2.00 | 2.00 | 2.00 |
| Sulfur |  | 2.00 | 2.00 | 2.00 |
| Vulcanization accelerator (CZ) |  | 1.00 | 1.00 | 1.00 |
| Vulcanization accelerator (DPG) |  | 0.50 | 0.50 | 0.50 |
| Tg (modified polymer) | ° C. | −54.67 | −54 | −49.33 |
| Modification rate (all nitrones) | mol % | 0 | 0.19 | 1.48 |
| Modification rate (nitrone (A)) | mol % | 0 | 0.19 | 0.00 |
| Modification rate (nitrone (B)) | mol % | 0 | 0.00 | 1.48 |
| $M_{100}$ | MPa | 1.5 | 1.9 | 1.6 |
| $M_{300}$ | MPa | 6.6 | 8.8 | 7.3 |

TABLE 1-continued

| | | | 18.4 | 17.7 | 17.2 |
|---|---|---|---|---|---|
| $T_B$ | MPa | | 18.4 | 17.7 | 17.2 |
| $E_B$ | % | | 583 | 482 | 521 |
| tanδ(0° C.) | | | 0.226 | 0.222 | 0.289 |
| tanδ(60° C.) | | | 0.165 | 0.144 | 0.158 |

| | | Working Examples | | | | | |
|---|---|---|---|---|---|---|---|
| | | 1 | 2 | 3 | 4 | 5 | 6 |
| Polymer | | 100.00 | 100.00 | 100.00 | 100.00 | 100.00 | 100.00 |
| Nitrone (A) (carboxynitrone) | Molecular weight 241.24 | 0.50 (0.15 mol %) | 1.00 (0.30 mol %) | 5.00 (1.5 mol %) | 1.00 (0.30 mol %) | 1.00 (0.30 mol %) | 1.00 (0.30 mol %) |
| Nitrone (B) (diphenylnitrone) | Molecular weight 197.23 | 10.00 (3.7 mol %) | 10.00 (3.7 mol %) | 10.00 (3.7 mol %) | 5.00 (1.9 mol %) | 20.00 (7.4 mol %) | |
| Nitrone (B) (monophenyl nitrone) | Molecular weight 191.27 | | | | | | 10.00 (3.8 mol %) |
| Silica | | 50.00 | 50.00 | 50.00 | 50.00 | 50.00 | 50.00 |
| Zinc oxide | | 3.00 | 3.00 | 3.00 | 3.00 | 3.00 | 3.00 |
| Stearic acid | | 1.00 | 1.00 | 1.00 | 1.00 | 1.00 | 1.00 |
| Antiaging agent | | 1.00 | 1.00 | 1.00 | 1.00 | 1.00 | 1.00 |
| Silane coupling agent | | 4.00 | 4.00 | 4.00 | 4.00 | 4.00 | 4.00 |
| Oil | | 10.00 | 10.00 | 10.00 | 10.00 | 10.00 | 10.00 |
| Diethylene glycol | | 2.00 | 2.00 | 2.00 | 2.00 | 2.00 | 2.00 |
| Sulfur | | 2.00 | 2.00 | 2.00 | 2.00 | 2.00 | 2.00 |
| Vulcanization accelerator (CZ) | | 1.00 | 1.00 | 1.00 | 1.00 | 1.00 | 1.00 |
| Vulcanization accelerator (DPG) | | 0.50 | 0.50 | 0.50 | 0.50 | 0.50 | 0.50 |
| Tg (modified polymer) | ° C. | −50.33 | −51.33 | −50.17 | −52.83 | −45.67 | −51.03 |
| Modification rate (all nitrones) | mol % | 1.21 | 0.93 | 1.25 | 0.51 | 2.50 | 1.01 |
| Modification rate (nitrone (A)) | mol % | 0.09 | 0.17 | 0.58 | 0.12 | 0.16 | 0.17 |
| Modification rate (nitrone (B)) | mol % | 1.12 | 0.76 | 0.67 | 0.39 | 2.34 | 0.84 |
| $M_{100}$ | MPa | 1.8 | 1.7 | 2.5 | 2.1 | 1.7 | 1.6 |
| $M_{300}$ | MPa | 8.3 | 8.1 | 11.7 | 10.4 | 7.9 | 7.3 |
| $T_B$ | MPa | 20.0 | 20.1 | 21.4 | 17.6 | 16.9 | 18.5 |
| $E_B$ | % | 555 | 557 | 469 | 439 | 521 | 540 |
| tanδ(0° C.) | | 0.273 | 0.252 | 0.261 | 0.230 | 0.405 | 0.236 |
| tanδ(60° C.) | | 0.144 | 0.134 | 0.122 | 0.134 | 0.136 | 0.135 |

The details of each component shown in Table 1 above are as follows.

Polymer: Emulsion polymerized SBR (NIPOL 1502, manufactured by Zeon Corporation)
Silica: Nipsil AQ, manufactured by Japan Silica Industry Co., Ltd.
Zinc oxide: Type 3 zinc flower, manufactured by Seido Chemical Industry Co., Ltd.
Stearic acid: Beads stearic acid YR, manufactured by NOF Corporation
Antiaging agent: SANTOFLEX 6PPD, manufactured by Soltia Europe
Silane coupling agent: Si69, manufactured by Evonik Degussa
Oil: Extract 4S, manufactured by Showa Shell Sekiyu K.K.
Diethylene glycol: manufactured by Nippon Shokubai Co., Ltd.
Sulfur: oil treatment sulfur, manufactured by Karuizawa Refinery Ltd.
Vulcanization accelerator (CZ): Nocceler CZ, manufactured by Ouchi Shinko Chemical Industrial Co., Ltd.
Vulcanization accelerator (DPG): Soxinol D-G, manufactured by Sumitomo Chemical Co., Ltd.

As shown in Table 1 above, it was confirmed that Comparative Example 2, in which the modified polymer that was modified with only the nitrone (A), resulted in a smaller value of tan δ (60° C.), and Comparative Example 3, in which the modified polymer that was modified with only the nitrone (B), resulted in a larger value of tan δ (0° C.), compared to Comparative Example 1, as a reference, in which the unmodified polymer was used. However, it was also confirmed that, in both Comparative Examples 2 and 3, the tensile strength ($T_B$) and the elongation at break ($E_B$) were lowered.

On the other hand, for example, both Working Examples 1 and 2 exhibited superior tan δ (0° C.) and superior tan δ (60° C.) compared to Comparative Example 1 which was a reference. Furthermore, the tensile strengths ($T_B$) were also enhanced, and the lowering of the elongations at break ($E_B$) was suppressed compared to those of Comparative Examples 2 and 3.

Furthermore, comparing Working Examples 2, 4, and 5 with Comparative Example 2 in which the same amount of the nitrone (A) was used, in Working Examples 2, 4, and 5 in which the nitrone (B) was also used in combination contrary to Comparative Example 2 in which only the nitrone (A) was used, the values of tan δ (0° C.) increased, and the value of tan δ (60° C.) decreased. In addition, Working Example 2 resulted in the better tensile strength ($T_B$) and elongation at break ($E_B$), Working Example 4 resulted in the better 300% modulus ($M_{300}$), and Working Example 5 resulted in the better elongation at break ($E_B$) than those of Comparative Example 2.

Furthermore, comparing Working Examples 1 to 3 with Comparative Example 3 in which the same amount of the nitrone (B) was used, in Working Examples 1 to 3 in which the nitrone (A) was also used in combination contrary to Comparative Example 3 in which only the nitrone (B) was used, the value of tan δ (60° C.) decreased, and the moduluses and tensile strengths ($T_B$) were enhanced. Furthermore, in Working Examples 1 and 2, the elongations at break ($E_B$) were also enhanced.

Furthermore, Working Example 6 in which a nitrone (B) that was different from the nitrone (B) of Working Examples 1 to 5 was used, in the same manner as in Working Example 2 which had the same proportions (parts by mass) for each of the components, resulted in the superior tan δ (0° C.) and the superior tan δ (60° C.) and somewhat enhancing the tensile strength ($T_B$) compared to those of Comparative Example 1, provided for reference. Furthermore, the lowering of the elongation at break ($E_B$) was suppressed compared to those of Comparative Examples 2 and 3.

What is claimed is:

1. A modified polymer that is modified with two or more types of nitrones including (A) a nitrone having at least one carboxy group and (B) a nitrone having no carboxy group.

2. The modified polymer according to claim 1, wherein the nitrone (B) is a nitrone having at least one aromatic hydrocarbon group.

3. The modified polymer according to claim 1, wherein the nitrone (A) is a nitrone represented by formula (a) below:

[Formula 1]

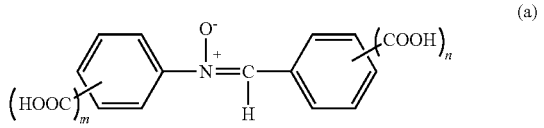

wherein, m and n each independently represent integers of 0 to 5, and a sum of m and n is 1 or greater.

4. The modified polymer according to claim 1, wherein the nitrone (B) is a nitrone represented by formula (b) below:

[Formula 2]

wherein, X and Y each independently represent aliphatic or aromatic hydrocarbon groups optionally having a substituent other than a carboxy group, and at least one of X or Y represents an aromatic hydrocarbon group optionally having a substituent other than a carboxy group.

5. The modified polymer according to claim 1, wherein the modified polymer contains a five-membered ring structure represented by formula (I) below:

[Formula 3]

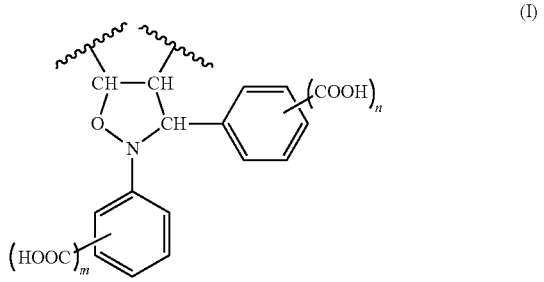

wherein, m and n each independently represent integers of 0 to 5, and a sum of m and n is 1 or greater.

6. The modified polymer according to claim 1, wherein the modified polymer contains a five-membered ring structure represented by formula (II) below:

[Formula 4]

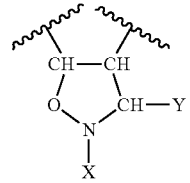

wherein, X and Y each independently represent aliphatic or aromatic hydrocarbon groups optionally having a substituent other than a carboxy group, and at least one of X or Y represents an aromatic hydrocarbon group optionally having a substituent other than a carboxy group.

7. The modified polymer according to claim 1, wherein a molar ratio (A/B) of the nitrone (A) to the nitrone (B) is from 1/1 to 1/100.

8. The modified polymer according to claim 2, wherein the nitrone (A) is a nitrone represented by formula (a) below:

[Formula 1]

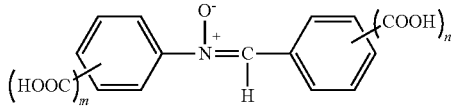

wherein, m and n each independently represent integers of 0 to 5, and a sum of m and n is 1 or greater.

9. The modified polymer according to claim 3, wherein the nitrone (B) is a nitrone represented by formula (b) below:

[Formula 2]

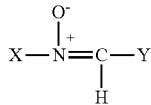

wherein, X and Y each independently represent aliphatic or aromatic hydrocarbon groups optionally having a substituent other than a carboxy group, and at least one of X or Y represents an aromatic hydrocarbon group optionally having a substituent other than a carboxy group.

10. The modified polymer according to claim 5, wherein the modified polymer contains a five-membered ring structure represented by formula (II) below:

[Formula 4]

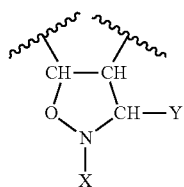

(II)

wherein, X and Y each independently represent aliphatic or aromatic hydrocarbon groups optionally having a substituent other than a carboxy group, and at least one of X or Y represents an aromatic hydrocarbon group optionally having a substituent other than a carboxy group.

11. The modified polymer according to claim 2, wherein a molar ratio (A/B) of the nitrone (A) to the nitrone (B) is from 1/1 to 1/100.

12. The modified polymer according to claim 3, wherein a molar ratio (A/B) of the nitrone (A) to the nitrone (B) is from 1/1 to 1/100.

13. The modified polymer according to claim 4, wherein a molar ratio (A/B) of the nitrone (A) to the nitrone (B) is from 1/1 to 1/100.

14. The modified polymer according to claim 8, wherein a molar ratio (A/B) of the nitrone (A) to the nitrone (B) is from 1/1 to 1/100.

15. The modified polymer according to claim 9, wherein a molar ratio (A/B) of the nitrone (A) to the nitrone (B) is from 1/1 to 1/100.

* * * * *